Figure 1:
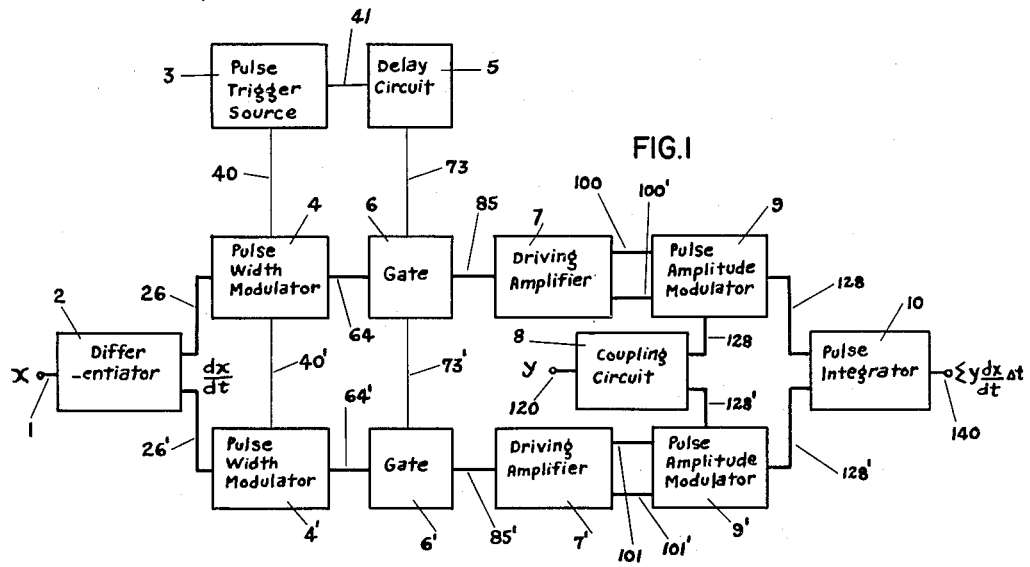

Nov. 29, 1955   J. M. HAM   2,725,191
APPARATUS FOR GENERAL ELECTRONIC INTEGRATION
Filed Dec. 27, 1948   6 Sheets-Sheet 1

INVENTOR
JAMES MILTON HAM

Nov. 29, 1955   J. M. HAM   2,725,191
APPARATUS FOR GENERAL ELECTRONIC INTEGRATION
Filed Dec. 27, 1948   6 Sheets-Sheet 2

INVENTOR
JAMES MILTON HAM
by Kenway Jenney Witter
& Hildreth
Attorneys

Nov. 29, 1955  J. M. HAM  2,725,191
APPARATUS FOR GENERAL ELECTRONIC INTEGRATION
Filed Dec. 27, 1948  6 Sheets-Sheet 3

INVENTOR
JAMES MILTON HAM

Nov. 29, 1955  J. M. HAM  2,725,191
APPARATUS FOR GENERAL ELECTRONIC INTEGRATION
Filed Dec. 27, 1948  6 Sheets-Sheet 5

INVENTOR
JAMES MILTON HAM

Nov. 29, 1955  J. M. HAM  2,725,191
APPARATUS FOR GENERAL ELECTRONIC INTEGRATION
Filed Dec. 27, 1948  6 Sheets-Sheet 6
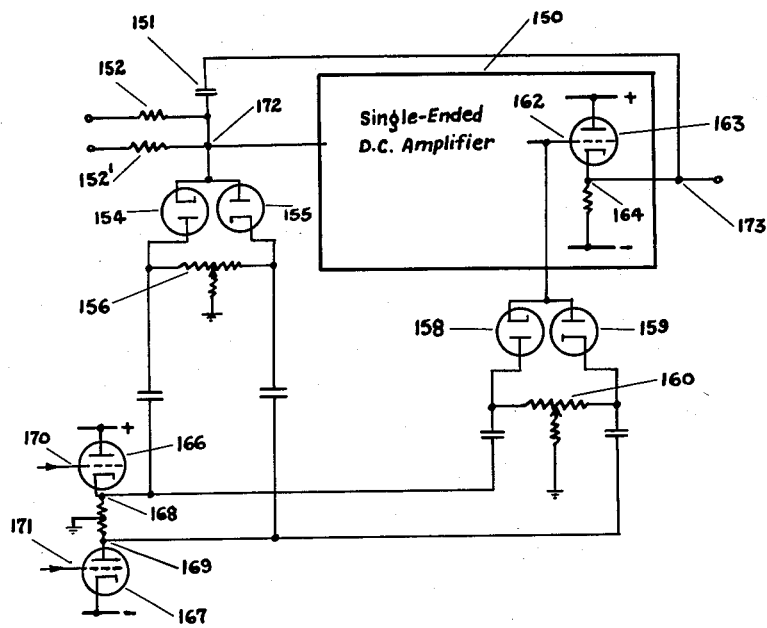
FIG.15
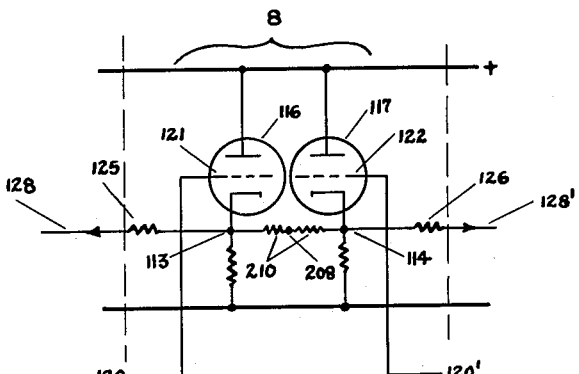
FIG.16
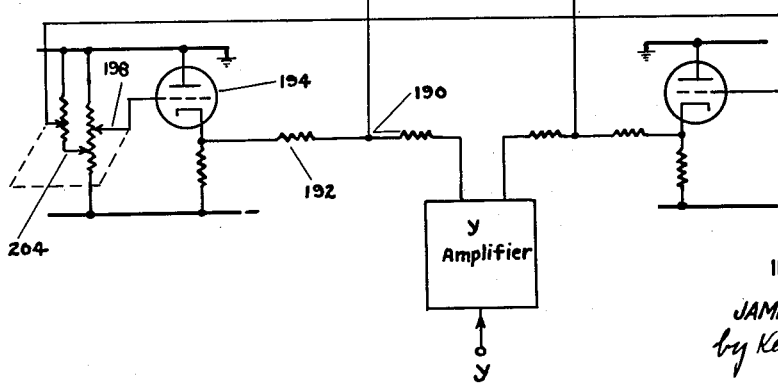
INVENTOR
JAMES MILTON HAM
by Kenway Jenney Witter
& Hildreth
Attorneys United States Patent Office 2,725,191
Patented Nov. 29, 1955

2,725,191

APPARATUS FOR GENERAL ELECTRONIC INTEGRATION

James Milton Ham, Toronto, Ontario, Canada

Application December 27, 1948, Serial No. 67,541

22 Claims. (Cl. 235—61)

The present invention relates to a method and apparatus for general electronic integration for analogue computation.

In electronic analogue computation operations such as addition, multiplication, differentiation and integration are performed by electronic units in which terminal voltages correspond to mathematical variables. The electronic units for analogue computation may assume many forms. Addition, subtraction, and integration with respect to time are readily accomplished with relatively simple feedback amplifiers. However, computing techniques employing such devices are limited in scope to the use of time as the independent variable. For generalized analogue computation, a general integrator is needed which utilizes an arbitrary voltage instead of time as an independent variable, that is, which performs the operation $\int y dx$ where both $x$ and $y$ are arbitrary voltages.

The principal object of this invention is to provide a simple electronic device to perform general integration.

With this and other objects in view, as will hereinafter appear, the present invention comprises an electronic device which integrates one arbitrary voltage with respect to another by generating a series of voltage pulses, modulating them so their durations or widths are controlled by the instantaneous amplitudes of one voltage and further modulating them so their amplitudes are controlled by the instantaneous amplitudes of the other voltage. The areas or duration-amplitude products of all the pulses in the modulated series are added together by a summation circuit to give the desired integral. Such a device produces rapid, accurate, step-by-step integration without the use of special tubes, bulky apparatus or critical balances.

For use in general analogue computation, as in the solution of a differential equation, a number of mathematical units, including general integrators may be connected according to standard differential analyzer technique, in a manner dictated by the equations to be solved. The electronic system is driven by the application of the independent variable voltage $x$. Since any such voltage may readily be made a periodic function of time, cyclically repeating solutions are easily obtained for display on the screen of an oscilloscope. Any voltage variable in the system may be displayed by connecting it to the vertical plates, either directly as a function of $x$, by connecting $x$ to the horizontal plates, or parametrically as a function of time, by driving the horizontal plates with the linear sweep circuit of the oscilloscope.

Figure 2:
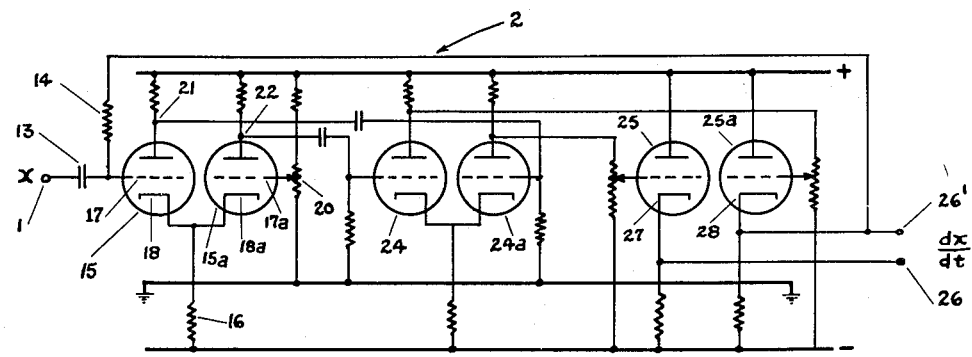
Figure 3:
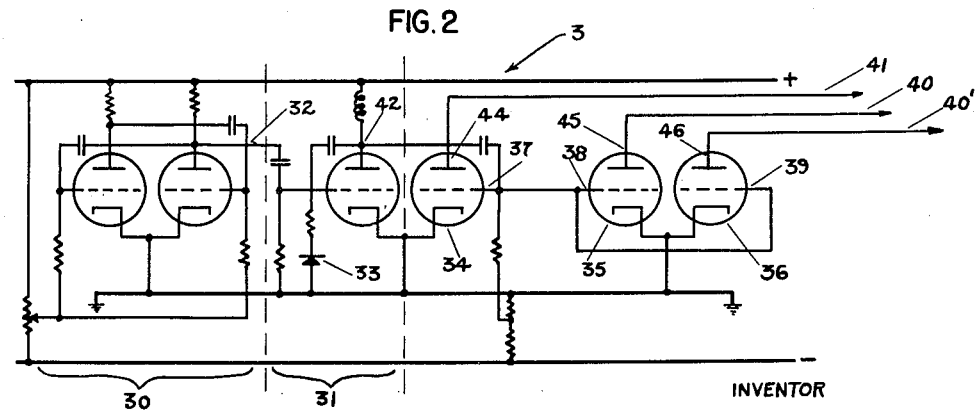
Figure 4:
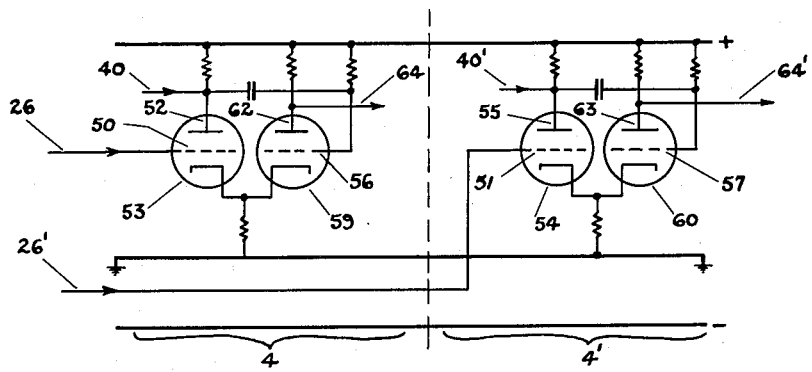
Figure 5:
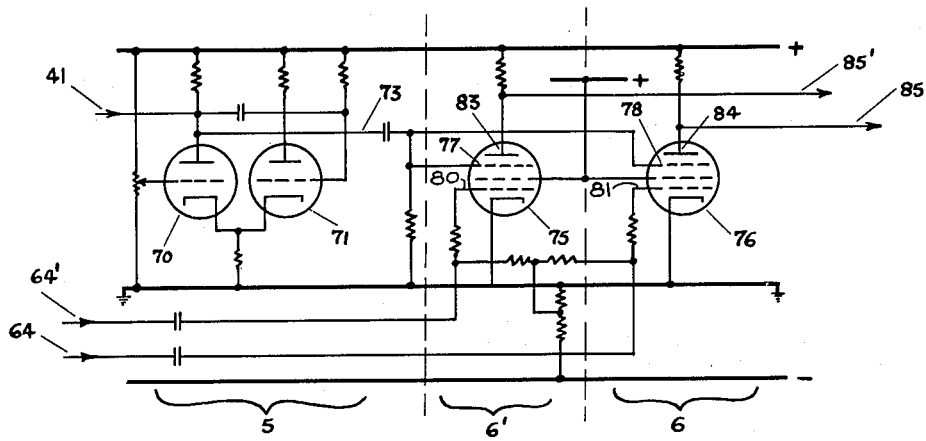
Figure 6:
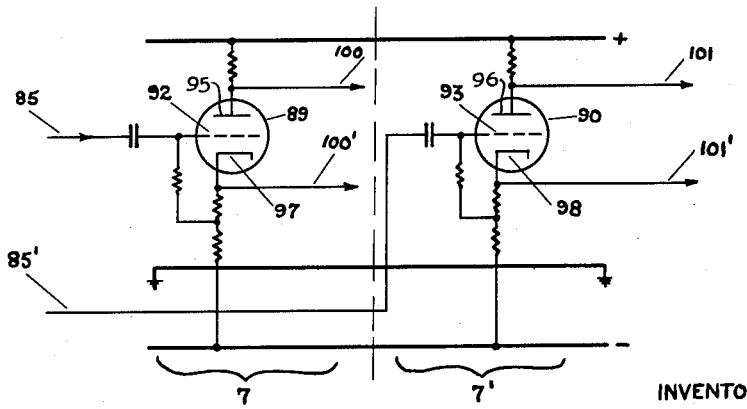
Figure 7:
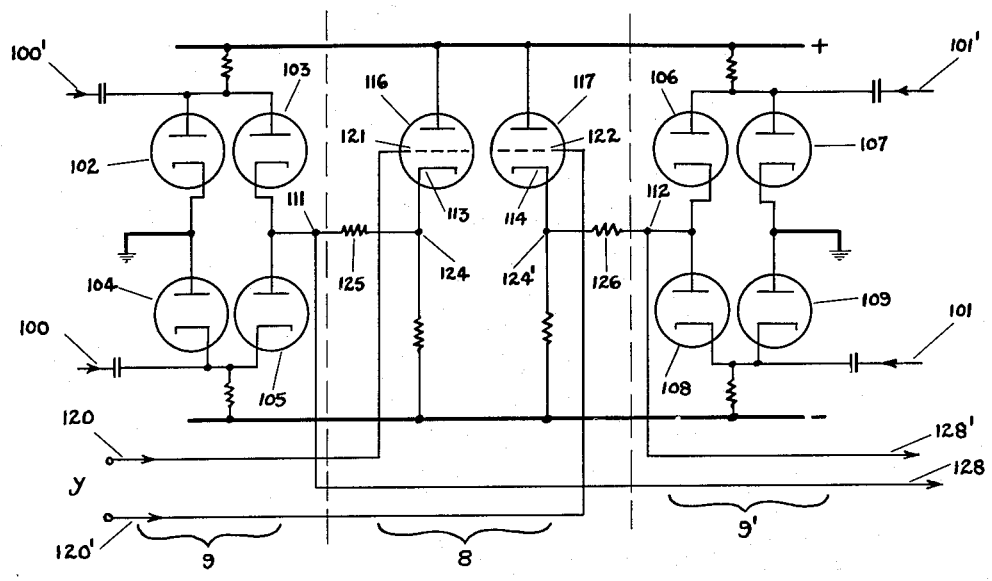
Figure 8:
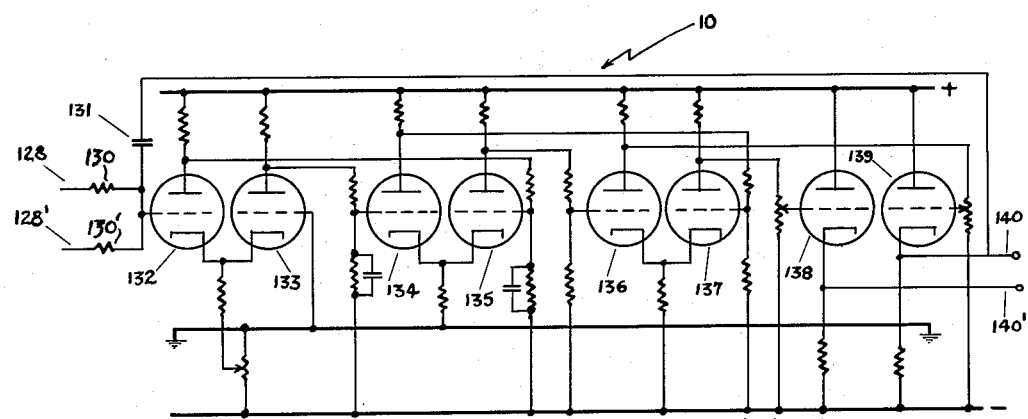
Figure 17:
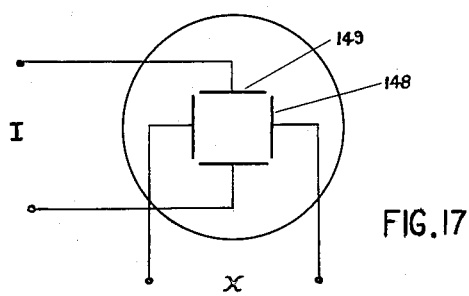
Figure 9:
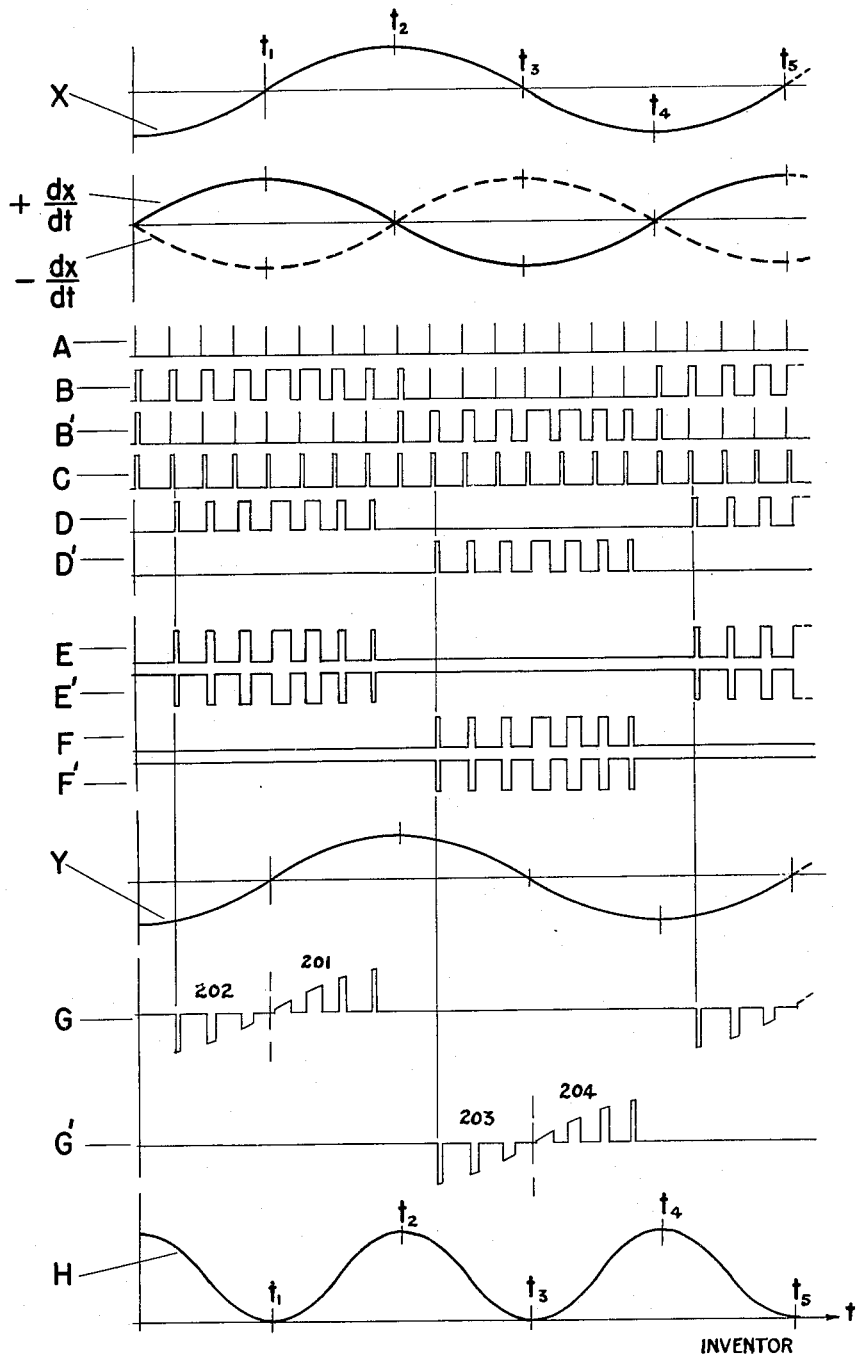
Figure 10:
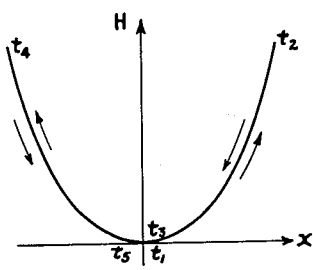
Figure 11:
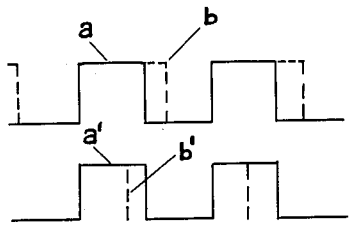
Figure 12:
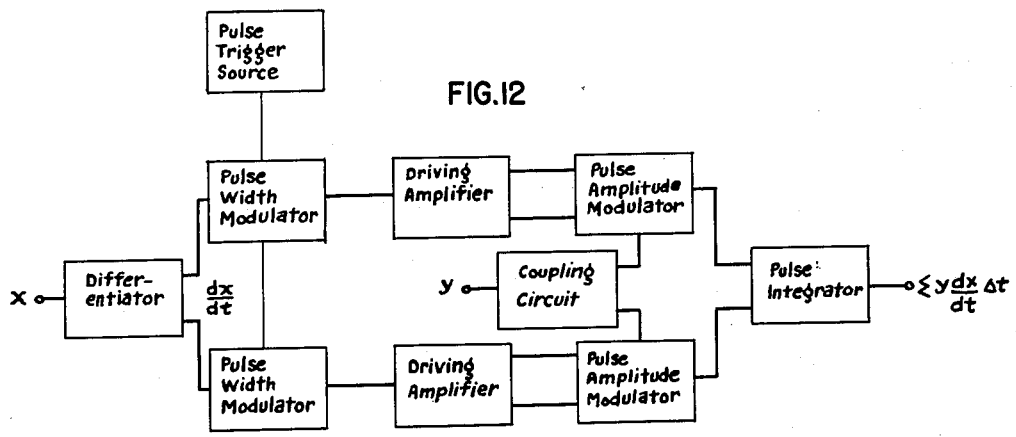
Figure 13:
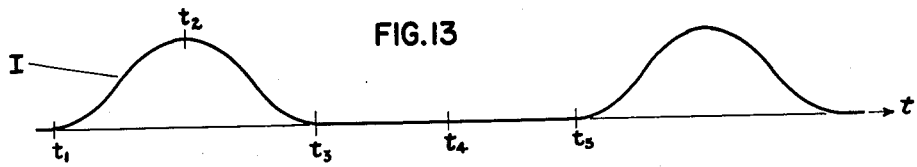
Figure 14:
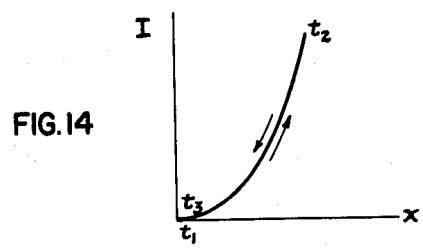

In the accompanying drawings which show a preferred embodiment of my invention, Fig. 1 is a diagram in block form, showing the various components whose circuits appear in subsequent drawings; Fig. 2 is a diagram of the circuit of the differentiator 2; Fig. 3 is a diagram of the pulse-trigger source circuit 3; Fig. 4 is a diagram of the pulse-width modulator circuits; Fig. 5 is a diagram of the delay circuit and gating circuit; Fig. 6 is a diagram of the driving amplifiers; Fig. 7 is a diagram of the y-coupling circuit and pulse-amplitude modulator circuits; Fig. 8 is a diagram of the pulse-chain integrator; Fig. 9 is a series of graphs of the voltage waveforms at various points in the integration process; Fig. 10 is a graph of a typical general integration; Fig. 11 illustrates an alternative mode of width-modulation; Fig. 12 is a diagram of the various components used for the alternate mode of width-modulation; Fig. 13 shows a typical general integration as a function of time after the introduction of integrator clamping; Fig. 14 shows a typical general integration as a function of the independent variable after the introduction of integrator clamping; Fig. 15 is a diagram of the circuit used for integrator clamping; Fig. 16 is a diagram of the circuit used for introducing initial values of the integrand into the y coupling circuit; and Fig. 17 is a diagram of the oscilloscope connections.

The preferred system is shown in the form of a block diagram in Fig. 1. According to this system the integral $\int y dx$ is evaluated wherein both $y$ and $x$ are parametric functions of time. The function $x$ expressed as a voltage varying with time is first differentiated to give $$\frac{dx}{dt}$$

This differentiation occurs in the circuit indicated at 2. A rapid succession of pulses is generated at 3. These pulses are modulated in width at 4 in accordance with the derivative $$\frac{dx}{dt}$$

The pulses are shaped in a manner to be described in detail later by the delay circuit 5 and the gating circuit 6. The width-modulated pulses pass through a driving amplifier 7 into a pulse-amplitude modulator indicated at 9. The function $y$ in the form of a voltage varying in time is fed through a coupling circuit 8 into the amplitude modulator. By this system the pulses are varied in area through the combined effects of width modulation as a function of the derivative of $x$ and amplitude modulation as a function of $y$.

Certain of the parts described above are duplicated as shown in Fig. 1. The duplicated parts are indicated by prime as, for example, 4', 6', 7', 9', etc. The purpose of this duplication is to provide separate channels for the handling of positive and negative values of $$\frac{dx}{dt}$$

since both positive and negative width-modulations are impossible in a single channel. The output voltages of the pulse-amplitude modulators 9 and 9', which voltages consist of a series of pulses modulated both in width and amplitude, are fed into a pulse integrator 10 wherein they are summed to give $$\Sigma y \frac{dx}{dt} \Delta t$$

which, because of the shortness of the time increment may be taken as equivalent to $$\int y \frac{dx}{dt} dt \text{ or } \int y dx$$

So far as the equipment thus far described is concerned, $x$ may be any arbitrary function of time. Preferably, however, $x$ is a periodic or repeating function of time, in order that the solution will likewise be a repeating function, which may be applied to the deflecting plates of an oscilloscope.

The components shown in the block diagram will now be described in detail.

The differentiator 2 shown in detail in Fig. 2 comprises an R-C high-pass filter 13 and 14, where the resistor 14 is the feedback element of a high-gain amplifier. Tubes 15 and 15a operate as a phase inverter by virtue of the large cathode resistor 16 which causes a voltage negative with respect to the voltage on control grid 17 to appear between the cathode 18a and control grid 17a. The tube is balanced by means of potentiometer 20. The two voltages at 21 and 22 on the plates of tubes 15 and 15a are amplified in tubes 24, 24a and 25, 25a arranged in push-pull. The balanced output voltage at 26 and 26' is taken from the cathodes 27 and 28 of tubes 25 and 25a.

The pulse-trigger source 3, shown in detail in Fig. 3, consists of a conventional free-running multivibrator 30 whose output voltage at 32 is passed through an R—L—C peaking circuit 31 to obtain a series of sharp pulses of extremely short duration. Three tubes 34, 35 and 36 are used to amplify the peaking circuit output 42 which is incident on grids 37, 38 and 39. Of the three pulse-chain outputs taken from the plates 44, 45 and 46 of tubes 34, 35 and 36, that indicated by 41 is conducted to the delay circuit 5 and those indicated by 40 and 40' are conducted to the width modulators 4 and 4' (Fig. 1).

The width modulators 4 and 4', shown in detail in Fig. 4, receive the balanced differentiator output from 26 and 26' on the control grids 50 and 51 of triodes 53 and 54 respectively. The output pulse chains from 40 and 40' (Fig. 3) of the pulse trigger source 3 (Fig. 1) are placed on the plates 52 and 55. Tubes 53 and 59, 54 and 60 are connected as cathode-coupled multivibrators or flip-flops. Grids 56 and 57 normally cause conduction in tubes 59 and 60. When a trigger pulse in the chains from 40 and 40' is incident upon the plates 52 and 55, conduction is transferred to tubes 53 and 54 and the voltages on grids 50 and 51 determine the lengths of time during which tubes 53 and 54 conduct. Conduction returns to tubes 59 and 60 before the arrival of the next trigger pulse at 52 and 55. The output voltages at points 64 and 64' are two series of pulses of varying duration or width and are obtained from the plates 62 and 63 of tubes 59 and 60.

These two voltage outputs at 64 and 64' are passed through gate circuits 6 and 6' shown in detail in Fig. 5. Triodes 70 and 71 are connected as a cathode-coupled multivibrator and are activated by the trigger-pulse chain 41 from the source 3. The output 73 from the tubes 70 and 71 is used to cut off gate tubes 75 and 76 for a short period of each pulse in the chain of pulses 64 and 64' which are incident on control grids 80 and 81. The reason for this shortening of the pulses will be considered in the discussion of the operation of the integrator. The outputs at points 85 and 85' from the gating circuits 6 and 6' are obtained from the plates 83 and 84 of tubes 75 and 76.

The outputs at 85 and 85' are passed through two push-pull amplifiers 7 and 7' (Fig. 1) shown in detail in Fig. 6. Tubes 89 and 90 are connected as phase splitters. A positive incremental voltage on either of the grids 92 or 93 causes a negative incremental voltage at the plate 95 or 96 and a positive incremental voltage at the cathodes 97 and 98. Thus, push-pull driving amplifier output voltages for positive widths are obtained at 100 and 100', while push-pull voltages for negative widths are obtained at 101 and 101'.

These chains of gating pulses pass to the amplitude modulators 9 and 9' shown in detail in Fig. 7. Diodes 102, 103, 104, 105, 106, 107, 108 and 109 receive the pulses. The arrangement of these diodes is such that, in the absence of gating pulses, they conduct, whereby points 111 and 112 are clamped to ground. When gating pulses are incident at 100, 100' or 101, 101', all the diodes in the corresponding amplitude-modulator cease conducting and point 111 or 112 is released from ground and assumes a potential determined by cathode 113 of tube 116 or cathode 114 of tube 117 in the y coupling stage 8, for a period equal to the width of the gating pulses. The cathode output voltages of tubes 116 and 117 are proportional in amplitude to the y-voltage which is introduced at points 120 and 120' incident on the associated control grids 121 and 122. Points 111 and 112 are on the connections 128 and 128' which lead directly from the output of the y coupling circuit 8 to the pulse-chain integrator or summation circuit 10, shown in detail in Fig. 8.

The integrator 10 (Fig. 8) is an R-C low-pass filter comprising resistors 130 and 130' and a capacitor 131, where the capacitor is the feed-back element of a high-gain amplifier. Tubes 132 and 133 act as a phase inverter for push-pull amplifier tubes 134, 135 and 136, 137 and 138, 139. The output 140 and 140' of the integrator is a continuous push-pull voltage which is equal to a constant times the integral of the y-voltage with respect to the x-voltage.

The operation of the invention will now be described. The general integral $\int y dx$ may be approximated by the summation $$\Sigma y \frac{dx}{dt} \Delta t$$

if $\Delta t$ is small. The present invention performs the latter operation.

Integration and differentiation with respect to time are readily accomplished by means of R-C circuits. If an input voltage $e_1$ is placed across a resistor (R) and capacitor (C) in series and an output voltage $e_2$ is taken from the terminals of the resistor, $$e_1 = iR + \frac{1}{C}\int i dt \text{ and } e_2 = iR$$

where $i$ is the current in the R-C loop. If the impedance of the capacitor is made large with respect to that of the resistor, and the R-C product is small, $$e_1 = \frac{1}{C}\int i dt; \ i = C\frac{de_1}{dt}$$

$$e_2 = RC\frac{de_1}{dt} \text{ (approx.)}$$

Similarly, if the output voltage $e_2$ is taken from the capacitor and the impedance of the resistor is made large with respect to that of the capacitor, and the R-C product is large, $$e_2 = \frac{1}{RC}\int e_1 dt \text{ (approx.)}$$

The differentiator 2 and integrator 10 use this device to effect differentiation and integration with respect to time.

The x-voltage introduced into the differentiator may, in general, be any voltage varying with time. For convenience it is often of sinusoidal form, although neither its waveform nor frequency is critical. In many analogue computations, the x-voltage will be the output of some other computing unit.

For convenience in explanation, I shall first describe the evaluation of $\int x dx$, and refer to Fig. 9 which shows the voltage waveforms at each stage of operation. In this example the x-voltage is shown in the uppermost graph as a sinusoid; specifically $x = -\cos t$. Therefore $$\frac{dx}{dt} = \sin t$$

shown in the second graph. The negative of $$\frac{dx}{dt}$$

is also shown, but in dotted lines, this being the input to the second channel.

In the differentiator 2 (Fig. 2), an amplifier is connected to feedback across the resistor 14. This serves a double purpose. First, improvement by way of accuracy is obtained over ordinary R-C characteristics. Second, a push-pull output 26 and 26' is produced which is useful to maintain the entire integration sensitive to the sign of the voltage $$\frac{dx}{dt}$$

The pulse trigger source 3, shown in detail in Fig. 3, is used to provide a series of sharp-pulse chains A (Fig. 9) whose repetition rate determines the frequency at which the width modulators 4 and 4' (Fig. 1) sample the $$\frac{dx}{dt}$$

voltage at 26 and 26'. The multivibrator 30 produces a square-wave voltage which, when incident on the R—L—C peaker circuit 31, causes a sudden large oscillation, the negative portion of which is eliminated by the diode 33. This half-oscillation is amplified by tubes 34, 35 and 36 to produce three series 40, 40' and 41 of high-amplitude, short-duration, sharp pulses. The chain A of Fig. 9 represents one of these series of pulses. These chains of pulses are used to trigger the cathode-coupled multivibrators or flip-flops in succeeding stages.

Thus, the $$\frac{dx}{dt}$$

voltages 26 and 26' are incident on the grids 50 and 51 of tubes 53 and 54 (Fig. 4) in the width modulators 4 and 4'. The pulses 40 and 40' are incident on the grids 56 and 57 of tubes 59 and 60 and plates 52 and 55 of tubes 53 and 54. These tubes are connected as cathode coupled multivibrators, and the pulses at 40 and 40' initiate a conduction cycle in tubes 53 and 54. The duration of this period is determined by the amplitude of the voltage 26 and 26' on the grids 50 and 51. When the conduction period ends, the other tubes 59 and 60 conduct until other pulses in the chains 40 and 40' repeat the cycle. The outputs at 64 and 64' are chains of pulses whose durations are fixed by the value of $$\frac{dx}{dt}$$

While this value changes over the conduction period, the pulse width produced under dynamic conditions will correspond to the static pulse width that would result from some value of $$\frac{dx}{dt}$$

existing during the pulse. This condition meets all the requirements for step-by-step integration.

If the voltage on one of the grids 50 or 51 is negative with respect to the quiescent grid bias, no modulated pulse will appear at its output. The $$\frac{dx}{dt}$$

voltage 26 and 26' is push-pull and so, if $$\frac{dx}{dt}$$

is positive, the incremental control grid voltage on grid 50 is positive and that on grid 51 is negative. If $$\frac{dx}{dt}$$

is negative, grid 51 receives a positive incremental voltage at 26' and grid 50 receives a negative voltage at 26. Thus, only one of the width modulators 4 and 4' produces a modulated output at any time and all output 64 from modulator 4 represents positive values of $$\frac{dx}{dt}$$

and all output 64' from modulator 4' represent negative values.

The discussion of direction sensitivity above is subject to the fact that the quiescent biases on grids 50 and 51 are set so that if the $$\frac{dx}{dt}$$

voltages at 26 and 26' are zero, pulses of short but constant duration are produced. A value of $$\frac{dx}{dt}$$

greater than zero causes these pulses to lengthen in proportion to the amplitude of the $$\frac{dx}{dt}$$

voltage at 26 and 26'. The reason for the pulses despite a zero value of $$\frac{dx}{dt}$$

is to ensure that non-linearity in modulators 4 and 4' for very narrow pulses will not affect the accuracy of the width-modulation process. The pulses at 64 as affected in width by the modulator 4, are indicated at B in Fig. 9. At B' is shown the succession of pulses at 64', as affected by the pulse modulator 4'. It will be noted that in general the pulses in row B correspond only to positive values of $$\frac{dx}{dt}$$

while the row B' represents pulses corresponding to negative values of $$\frac{dx}{dt}$$

While pulses in rows B and B' are generally exclusive of each other at any particular instant of time, there is some overlap due to the above-mentioned quiescent bias on the tubes of modulators 4 and 4' whereby pulses are continuously generated when there is no x-input, as described above.

The third series 41 (Fig. 3) of the trio of sharp-pulse chains A is used to trigger a delay circuit 5 (Fig. 5). The pulses introduced through the delay circuit into the gate circuit are shown at C in Fig. 9. The delay circuit comprises the tubes 70 and 71 connected as a cathode-coupled multivibrator adjusted to produce pulses at 73 of the same duration as the quiescent pulses of the width-modulators 4 and 4' (Fig. 9). Its operation will be apparent to those skilled in the art from the discussion above of the cathode-coupled multivibrators in the width-modulation stage. These pulses are passed to the suppressor grids 77 and 78 of gate tubes 75 and 76, cutting off those tubes for the duration of each pulse in chain 73, that is for a time equal to the time taken in the chain by the quiescent pulses in chains B and B'. Thus, the gating circuits 6 and 6' remove that part of the duration of each pulse in chains B and B' which represent a zero value of $$\frac{dx}{dt}$$

The shaped pulses are shown in rows D and D' in Fig. 9. It will be observed that these pulses are of uniform amplitude but vary in width or duration in accordance with $$\frac{dx}{dt}$$

row D containing the pulses for positive derivative and D' for negative derivative.

In the driving amplifier 7 the pulses D are converted to two chains of pulses in push-pull shown at E and E'. Similarly the chain B' is converted in the amplifier 7' into the chains F and F'.

At this point the $y$-voltage is introduced through the coupling circuit 8 into the amplitude modulators 9 and 9'. The chains E and E' and the chains F and F' are shown in push-pull for excitation of the amplitude modulators 9 and 9'. For purposes of explanation, however, it will be sufficient to refer to the positive and negative chains D and D'. These chains are now modulated in amplitude by the $y$-function. Since $y=x$ in the example chosen, it is also shown in Fig. 9 as the negative cosine of time. It will be understood that since negative amplitudes may exist in the push-pull circuit, there is no requirement for further dividing the $y$-voltage.

When no pulses are present all the diodes in Fig. 7 conduct by virtue of the B+ and B— supplies and cause the potentials of points 111 and 112 to go to ground. If a negative pulse of sufficient magnitude (such magnitude being supplied by the driving amplifiers 7 and 7') appears at the plates of diodes 102 and 103, they cease conducting. Because the pulse chains E, E' and F, F' are in push-pull, a positive pulse appears at the same time in chain 100' to cut off diodes 104 and 105. Thus, point 111 is isolated from ground and since it is connected through resistor 125 to the cathode 124 of tube 116, point 111 assumes a potential proportional to the $y$ input-voltage to grid 121 of tube 116. Consequently, at the output 128 appears a voltage proportional to the amplitude of the $y$-voltage incident on grid 121 and having the same direction as the $y$-voltage 120 for a period determined by the duration of the pulses in the chains E and E'. Thus, the outputs leading to the integrator 10 consist of chains of pulses G and G' whose direction and amplitude (height) is proportional to the $y$-voltage at any instant and whose duration (width) is proportional to the $$\frac{dx}{dt}$$

voltage. The chain G includes all of the pulses corresponding to the positive derivative and chain G' contains all of the pulses corresponding to the negative derivative regardless of the sign of the $y$ function.

The area (amplitude-duration product) of each of these pulses is proportional to the product of $y$ and $$\frac{dx}{dt}$$

at that instant. Integration with respect to time will give the sum $$\Sigma y \frac{dx}{dt} \Delta t$$

and smooth out the pulse chain into a continuous voltage. An R-C feedback integrator 10, detailed in Fig. 8, using resistors 130 and 130' and capacitor 131 with phase inverter tubes 132, 133 and push-pull amplifier tubes 134, 135 and 136, 137 and 138, 139 connected across the capacitor 131, is used to obtain the final solution H to the integration. The integration effect of the R-C combination is explained above.

It should be noted that the junction of voltages G and G' at the resistors 130 and 130' will have the effect of adding algebraically all of the $$y \frac{dx}{dt}$$

products. There are four possible combinations:

$(201) +y, +\frac{dx}{dt}; (202) -y, +\frac{dx}{dt}; (203) +y, -\frac{dx}{dt}; (204) -y, \frac{dx}{dt}$ The waveforms G and G' show the distinction between them.

The solution H is in the form of a push-pull time-varying voltage shown in Fig. 9. (It should be understood in considering Fig. 9 that in practice the number of pulses per cycle of independent variable voltage 1 will not be sixteen as shown, but of the order of four thousand pulses per cycle of voltage variable.) The solution voltage H may be used to actuate control devices or for other suitable purposes. It may be fed through further stages of integration or other apparatus if it represents an intermediate stage in the problem solution. The voltage H may be displayed on an oscilloscope by connecting the output 140 to the vertical plates, while a conventional linear sweep is connected to the horizontal plates. The voltage H will then appear as a function of time as shown in Fig. 9.

On the other hand, if the $x$-voltage is connected to the horizontal plates, the integral will appear as a function of $x$. As shown in Fig. 10, voltage 140 if shown as a function of $x$ will appear on the screen of the oscilloscope as a parabola. Since in the example chosen, $y=x$, the integral as a function of $x$ is $\frac{1}{2}x^2$. The comparison of Figs. 9 and 10 is shown by reference to the times designated $t_1$ to $t_5$. In Fig. 9, $x$ and H are shown as functions of $t$, while in Fig. 10, the integral is shown as a function of $x$ for the several values of time. If the independent variable goes through a succession of cycles, the trace of the parabola on the screen is repeated. Therefore, in Fig. 10, time does not appear explicitly, and the object of general integration, independent of time, has been attained.

*Alternative mode of width-modulation*

A modified, and in some respects, preferable mode of width modulation is shown in Fig. 11. This eliminates the need for the delay circuit 5 and gating circuits 6 and 6'. In Fig. 11 are shown two chains of pulses derived from this alternative method. The circuit necessary to accomplish the operation is no different from that shown in Fig. 4, the only change in operation being to set the quiescent bias on the grids 50 and 51 in the cathode-coupled multivibrators so they generate wide pulses for a zero value of $$\frac{dx}{dt}$$

such as $a$ and $a'$ in Fig. 11. A positive value of $$\frac{dx}{dt}$$

will cause the pulse $a$ generated by the width modulator 4 to increase in length, as indicated in dotted lines at $b$ in Fig. 11, and the pulse $a'$ generated by width modulator 4', to decrease in length as indicated at $b'$. A negative value of $$\frac{dx}{dt}$$

will cause the length of pulse $a$ to decrease and that of pulse $a'$ to increase.

After modulation by the $y$-voltage in the amplitude modulators 9 and 9' the two chains of pulses are brought together in the integrator 10. There, the quiescent value of pulse-length common to both chains denoted by $a$ and $a'$ is cancelled out since the two chains of pulses when they enter the integrator will be of exactly the same amplitude, but of opposite sign. After the chains merge in the integrator input, there remain only the incremental changes in pulse length shown by $b$ and $b'$. It will be apparent that the direction sensitivity is maintained. By using this method of width modulation, the sensitivity of the integrator is doubled and the need for delay circuit 5 and gating circuits 6 and 6' is eliminated. In addition to the simplification of circuits, an advantage is that small values of $$\frac{dx}{dt}$$

are no longer represented by narrow pulses which are difficult to amplify accurately. Furthermore, the overlap due to quiescent bias, as appears at B and B' in Fig. 9, is effectively eliminated.

The block diagram for the modified circuit is shown in Fig. 12. This is identical with Fig. 1 except for the omission of circuits 5, 6 and 6'.

Generation of the y-function

In the specific example given herein, $y=x$, hence the same input voltage was used for both functions. In general, of course, $y$ and $x$ are not identical. The $x$-function being chosen as a function of time, the $y$-function may be generated as a function of time by any suitable function-generator, as will be clear to those skilled in the differential analyzer art. In many instances, $y$ may consist of the output of a preceeding integrator; for example if $y=x^2$, $y$ may be obtained as the output of the foregoing example, namely, solution H of Fig. 9 (subject to the fixing of integration constants, as will be explained presently). Another example is $y=e^x$, for $y$ is obtained by setting up an integrator to solve the differential equation $$\frac{dy}{dx}=y \text{ or } y=\int y dx$$

D. C. values in integrator output

Any RC integrator will integrate accurately for a finite time determined largely by the magnitude of the product KRC where K is the gain of the amplifier. If the integrator is excited by cyclically varying input voltage (as in Fig. 9) the average value of the output voltage must eventually fall to zero. Thus if, as in the preceding example, the integrator is supposed to produce $\cos^2 t$ which is always positive, after a certain time the waveform will shift downwards at the output of the integrator until its average value is zero. This effect must be avoided for the D. C. level of the integrator output is mathematically important. The retention of D. C. values is accomplished by using the integrator for but one solution at a time. Referring to Fig. 9, this may be done conveniently by integrating over the part-cycle $t_1$ to $t_3$ only. The integrator is returned to its initial state and clamped there over the interval $t_3$ to $t_5$. In the next half-cycle beginning at $t_5$ the integrator is permitted to repeat the solution.

The solution I as a function of time is shown in Fig. 13. This may be displayed in an oscilloscope by connecting the usual linear sweep to the horizontal-deflecting plates. The general integral (i. e. as a function of $x$) is obtained by connecting the $x$-voltage to the horizontal-deflecting plates shown at 148 in Fig. 17, while the I-voltage is connected to the vertical-deflecting plates 149. The solution is displayed as the half-parabola of Fig. 14.

For accomplishing this result, to the integrator stage 10 of Fig. 1 is added a clamping circuit, shown in Fig. 15. Instead of a push-pull amplifier, a single-ended amplifier 150 is connected across the integrating capacitor 151. Point 172, which is the junction of resistors 152 and 152' with the input grid of the integrating amplifier, is connected to ground through two diodes 154 and 155 and bridge potentiometer 156. Resistors 152 and 152' correspond to resistors 130 and 130' in Fig. 10. Capacitor 151 in Fig. 15 corresponds to capacitor 131 in Fig. 10. A similar circuit comprising diodes 158 and 159 and bridge potentiometer 160, is connected between the grid 162 of the last tube 163 in the amplifier 150 and ground.

These diode sets are activated by the cathode 168 and plate 169 respectively, of the triode amplifiers 166 and 167.

The clamping circuit of Fig. 15 operates by causing both sides of the integrating capacitor 151 to be connected to ground over one half of the independent variable voltage cycle. On the grids 170 and 171 of the triodes 166 and 167 a square wave, derived from the $x$ voltage is incident. This voltage is synchronized with the independent variable and has its negative value during the period of positive values of the independent variable, and its positive value when $x$ is negative. The triodes 166 and 167 are cut off when the independent variable voltage is positive. When the independent variable voltage becomes negative, the voltage incident on grids 170 and 171 is positive and causes triodes 166 and 167 to conduct, driving the plate 169 negative and the cathode 168 positive. In this condition, the diodes 154 and 155, 158 and 159 conduct. Diodes 154 and 155, when conducting, cause point 172 to seek a potential determined by the setting of the bridge potentiometer 156. The potential will not be affected by any input to the integrator stage through resistors 152 and 152'. Similarly, diodes 158 and 159, when conducting, cause grid 162 of tube 163 to seek a potential determined by the bridge potentiometer 160. The clamped potential of grid 162 may be made such as to make the potential of cathode 173 of tube 163 zero. The point 173 is thus grounded. The existing charge on the capacitor 151 is dissipated.

Then the voltage incident on grids 170 and 171 of tubes 168 and 169 takes its negative value and the tubes cut off, restoring the voltage at the plate 169 and cathode 168 to ground. All the diodes cease conducting and points 172 and 173 are free to assume their normal potentials. The integrator voltage starts at the same value it did in the preceding cycle.

The clamping process permits successive solutions to be the same and prevents the accumulation of errors. If any unit goes off scale during the solution the clamping circuits automatically restores it and scale factors may be altered rapidly to reestablish a useful solution.

Transient behavior

In any physical system the response to rapid changes in excitation must usually be considered. In the present invention the $x$-function does not introduce any serious problem of transient response. In the first place, the transient time constants of the differentiating circuits are negligible in comparison with the solution time of the system. Furthermore, in most instances, so far as the $x$-function is concerned, the solution may be regarded as starting with a zero value of $x$.

However, the $y$-function may have an initial value other than zero. If so, an undesirable transient may be introduced in the effort of the system to accommodate itself to this initial value. To avoid such a transient, the invention preferably has means for supplying non-zero initial values of the integrand. This may be conveniently accomplished by the use of suitable sources of D. C. potential, such as batteries, in the leads 120 and 120' of Fig. 7 (positive in one lead and negative in the other). The use of external sources may be avoided by the circuit shown in Fig. 16, in which the portion between the dash lines includes the $y$-coupling circuit 8 of Fig. 7.

The initial value of $y_0$ is inserted by adding to the $y$ signal voltages which occur on grids 121 and 122 of tubes 116 and 117, bias voltages of the appropriate magnitude. I shall describe only how the bias voltage proportional to $y_0$ is inserted on grid 121. A similar argument follows for grid 122. Resistors 190 and 192 form a potential divider from the plate of an output tube in the $y$ amplifier to the cathode of tube 194. The potential at grid 121 depends in particular upon the potential of the cathode of tube 194 which may be varied linearly with the grid voltage of tube 194 because the tube is operating as a cathode follower and carries a plate current and hence cathode current much larger than the current in resistors 190 and 192. A potentiometer 198 controls the voltage on grid of tube 194. By varying potentiometer 198 the cathode voltage of tube 194 and hence the bias potential of grid 121 can be set to the desired value. A voltmeter connected to the cathode 113 of tube 116 permits the cathode voltage of the tube to be read and the voltage of grid 121 is varied by potentiometer 198 to produce the desired cathode voltage on the tube. This cathode voltage feeds into the diode amplitude modulators of Fig. 7 through resistor 125.

The adjustment of the bias potential of grid 121 by means of the tube 194 does not affect the A. C. amplification from the y-input to grid 121 because the A. C. impedance of tube 194 at its cathode is very small compared to resistors 190 and 192. Thus the desired bias level can be inserted independently of the A. C. signal. Exactly the same procedure follows for grid 122. The voltage on grid 122 is set roughly by the potentiometer 198 used to set the bias on grid 121. Then the balance potentiometer 204 is adjusted until a voltmeter connected from 208 to ground reads zero. Then the cathodes of tubes 116 and 117 have equal bias levels of opposite polarity. Resistor 210 is a high resistance for measurement purposes. The bias levels on the cathodes of tubes 116 and 117 feed into the width modulators together with the A. C. y signal and modulate the pulse amplitudes.

By this arrangement, only the change of $y$ from its initial value $y_0$ is used to drive the y-amplifier. Since the change of $y$ starts from a zero value for all solutions, no transient effects are introduced by any effort of the system to adjust itself suddenly to a non-zero initial value of $y$.

Conclusion

According to the present invention, the amplitude-duration products of a succession of pulses, modulated both in width and amplitude in accordance with the input functions, are algebraically summed to give the integral function. The integral may appear either as a parametric function of time, or more usefully as a function of one of the variables and independent of time. In the particular embodiment of the invention herein described, the given functions are $x$ and $y$, and the integrator performs the integration $$\int y\,dx \text{ or } \int y\frac{dx}{dt}dt$$

Therefore, the integrator may be viewed as accomplishing the general integration of any function with respect to another, the given functions being $x$ and $y$ in the examples chosen. More generally, however, the given functions may be viewed as $y$ for one, and any other parametric function of time in place of $$\frac{dx}{dt}$$

Denoting this other function by $F(t)$, and $y$ by $f(t)$ the integrator will evaluate $\int f(t)\,F(t)\,dt$, by omitting the differentiator 2, and introducing $F(t)$ directly into the width-modulator channels. For displaying integration independent of time, either function may be applied to one set of deflecting plates of the oscilloscope, and the integral I to the other set.

In any case therefore, regardless of the actual input functions, the system effects the general integration of one function with respect to another.

In other respects also, it will be understood that the structures and circuits herein described may be modified without departing from my invention, as defined in the appended claims.

Having thus described my invention, I claim:

1. In an electronic integrator for integrating one function with respect to another comprising a pulse generator to generate a chain of pulses, the period between corresponding edges of the pulses being constant, means for varying the duration of the pulses within the constant period in accordance with the instantaneous values of one function, means in series with the width-varying means for varying the amplitude of each pulse in accordance with the instantaneous values of the other function, and a time-integrator whose input is the pulses and whose output is the time-integral of the input.

2. An electronic integrator for integrating one function with respect to another comprising a pulse generator to generate a constant-frequency chain of pulses, a pulse-width modulator to vary the pulse durations in accordance with instantaneous positive values of one function without varying the frequency, a second pulse-width modulator to vary the pulse durations in accordance with instantaneous negative values of said function, a pulse-amplitude modulator controlled by the other function to vary the amplitudes of the width-modulated pulses in both channels, and a charge accumulator for algebraically adding together the charges of the successive pulses of both channels.

3. An electronic integrator for integrating one function with respect to another comprising a pulse generator to generate a constant-frequency chain of pulses, a pulse-width modulator to vary the pulse durations in accordance with instantaneous positive values of one function, a second pulse-width modulator to vary the pulse durations in accordance with instantaneous negative values of said function neither of said modulators varying the frequency, gating circuits to eliminate short pulses from said modulators due to quiescent bias, a pulse-amplitude modulator controlled by the other function to vary the amplitudes of the width-modulated pulses in both channels, and a charge accumulator for algebraically adding the individual charges of the pulses of both channels.

4. An electronic integrator for integrating one function with respect to another comprising a pulse generator to generate a constant-frequency chain of pulses, two channels into which pulses of uniform duration are directed from the generator, width-modulating means for increasing the width of the pulse in one channel and decreasing it in the other in accordance with the instantaneous values of one function without changing the frequency, a pulse-amplitude modulator for varying the amplitude of the pulses in accordance with the other function, means for causing the width-modulating means and the amplitude modulator to act successively on the pulses, and a charge accumulator for adding algebraically the net charges of the doubly-modulated pulses.

5. An electronic integrator for integrating one function with respect to another comprising a pulse generator to generate a chain of pulses, the period between corresponding edges of the pulses being constant, means for varying the duration of the pulses within said constant period in accordance with the instantaneous values of one function, means for varying the amplitude of each duration-modulated pulse in accordance with the instantaneous values of the other function, and a summation circuit to produce an output which is the sum of the time-integrals of the amplitudes of each of the incremental pulses, and means operative only over selected intervals of one of the functions for effecting said summations, said means acting to set the summation circuit to a uniform zero-sum condition except in said intervals.

6. An electronic integrator for integrating one function with respect to another comprising a pulse generator to generate a chain of pulses in regular succession, a pulse-width modulator to vary the duration of the pulses in accordance with instantaneous values of one function, a pulse-amplitude modulator to vary the amplitude of the duration-modulated pulses in accordance with instantaneous values of the other function, a charge accumulator to obtain the sum of the charges of the successive pulses, and a clamping circuit operative over selected values of one of the functions for rendering the summation circuit ineffective and for restoring said circuit to a zero-charge condition.

7. An electronic integrator for integrating one function with respect to another comprising a pulse generator to generate a chain of pulses in regular succession, means for varying the duration of the pulses in accordance with the instantaneous values of one function, means for varying the amplitude of each duration-modulated pulse in accordance with the instantaneous values of the other function, an integrating circuit to produce an output which is the sum of the time-integrals of the amplitude of each of the incremental pulses, an oscilloscope having two deflecting means, and connections to excite one of the deflecting means in accordance with said output and the other in accordance with one of said functions.

8. An electronic integrator for evaluating $\int y\,dx$ comprising a pulse generator, a differentiator into which an arbitrary $x$-voltage is introduced to obtain a voltage varying in accordance with $$\frac{dx}{dt}$$

the derivative with respect to time of said arbitrary $x$-function, a width modulator and an amplitude modulator both acting successively on each pulse, means for controlling one modulator in accordance with values of $y$ and the other in accordance with values of $$\frac{dx}{dt}$$

an integrating circuit to produce an output which is the instantaneous sum of the time-integrals of the amplitudes of each of the successive modulated pulses, an oscilloscope having two deflecting means, and connections to excite one of the deflecting means in accordance with said output and the other in accordance with the values of the $x$-function.

9. An electronic integrator for evaluating $\int f(t)F(t)dt$, the integral with respect to physical time $t$ of the product of two functions of time, comprising a pulse generator to generate pulses the period between corresponding edges of successive pulses being constant, two pulse-width modulators for varying the duration of each pulse within said constant period in accordance with instantaneous positive and negative values of one function $f(t)$, a pulse-amplitude modulator for varying the amplitude of each width-modulated pulse in accordance with the instantaneous values of the other function $F(t)$ and a charge accumulator to effect the algebraic summation $$\Sigma f(t)F(t)\Delta t$$

of the incremental pulse charges in the succession of pulses.

10. An electronic integrator for integrating one function with respect to another comprising a pulse generator to generate a chain of pulses, the period between corresponding edges of the pulses being constant, means for varying the duration of the pulses within said constant period in accordance with the instantaneous values of one function, means in series with the duration-varying means for varying the amplitude of each pulse in accordance with the instantaneous values of the other function, an integrator to produce an output which is the sum of the time-integrals of the amplitude of each of the incremental pulses, and means operative only over selected intervals of one of the functions for effecting said summations, said means acting to set the integrator to a zero-sum condition except in said intervals.

11. An electronic integrator for integrating one function with respect to another comprising a pulse generator to generate a chain of pulses in regular succession, means for varying the duration of the pulses in accordance with the instantaneous values of one function, means in series with the duration-varying means for varying the amplitude of each pulse in accordance with the instantaneous values of the other function, an integrator to produce an output which is the sum of the time-integrals of the amplitudes of the incremental pulses, and means operative only over selected intervals of one of the functions for effecting said summations, said means including a clamping circuit acting at times between said intervals to hold a part of said summation circuit at a fixed potential.

12. An electronic integrator for integrating one function with respect to another comprising a pulse generator to generate a chain of pulses in regular succession, means for varying the duration of the pulses in accordance with the instantaneous values of one function, means in series with the duration-varying means for varying the amplitude of each pulse in accordance with the instantaneous values of the other function, an integrator to produce an output which is the sum of the time-integrals of the amplitudes of each of the incremental pulses, and a clamping circuit operative over selected values of one of the functions for rendering the integrator ineffective and for restoring said integrator to a zero-sum condition.

13. An electronic integrator for evaluating $\int f(t)F(t)dt$, the integral with respect to physical time $t$ of two time-varying functions, comprising a pulse generator to generate a constant-frequency chain of pulses in two channels, width modulators in the two channels to vary the width of each pulse about a non-zero quiescent width in accordance with instantaneous values of $f(t)$, one of said width modulators acting to increase the width of the pulse while the other width modulator decreases it and neither varying the frequency, gating circuits for removing the quiescent pulse width from each width modulating channel, amplitude modulation means in series with the width modulators for varying the amplitudes of the pulses in accordance with instantaneous values of $F(t)$, and a charge accumulator for algebraically adding the individual charges of the modulated pulses from both channels.

14. An electronic integrator for integrating one function with respect to another comprising a pulse generator to generate a chain of pulses, the period between corresponding edges of successive pulses being constant, means for varying the duration of the pulses within said constant period in accordance with the instantaneous values of one function, means in series with the duration-varying means for varying the amplitude of each pulse in accordance with the instantaneous values of the other function, an integrator whose input is the pulses and whose output is the time-integral of the net amplitude of its input, and means for biasing the amplitude-varying means in accordance with non-zero initial values of one of the functions.

15. An electronic integrator for integrating one function with respect to another comprising a pulse generator to generate a chain of pulses in regular succession, means for representing the functions as electrical quantities varying repetitively with time, means for varying the duration of the pulses in accordance with the instantaneous values of one function, means in series with the duration-varying means for varying the amplitude of each pulse in accordance with the instantaneous values of the other function, an integrating circuit to produce an output which is the instantaneous sum of the time-integrals of the amplitudes of each of the successive varied pulses, an oscilloscope having two deflecting means, and connections to excite one of the deflecting means in accordance with said output and the other in accordance with one of said functions.

16. An electronic integrator for evaluating $\int y\,dx$ comprising means for representing the $x$-function as an electrical quantity varying repetitively with time, means for representing the $y$-function as an electrical quantity varying repetitively with time in accordance with functional relationship between $x$ and $y$, a differentiator into which the $x$-function is introduced to obtain a voltage varying in accordance with $$\frac{dx}{dt}$$

a pulse generator to generate a chain of pulses in regular succession, a width modulator and an amplitude modulator acting in series on the pulses, means for controlling one modulator in accordance with values of $y$ and the other in accordance with values of $$\frac{dx}{dt}$$

an integrating circuit to produce an output which is the instantaneous sum of the time-integrals of the amplitudes of each of the successive modulated pulses, an oscilloscope having two deflecting means, and connections to excite one of the deflecting means in accordance with said output and the other in accordance with one of the original functions, whereby a solution independent of time is displayed on the oscilloscope.

17. An electronic integrator for evaluating $\int y\,dx$ comprising a pulse generator to generate a succession of pulses, the period between corresponding edges of the pulses being constant, a pulse-width modulator for varying the duration of each pulse within said constant period in accordance with instantaneous values of $$\frac{dx}{dt}$$

the derivative with respect to physical time $t$ of the quantity $x$ expressed as a function of time, a pulse-amplitude modulator for varying the amplitude of each pulse in accordance with instantaneous values of $y$, means for passing the pulses through the modulators in succession, and a time-integrator whose input is the pulses and whose output is the time-integral of the input.

18. An electronic integrator for integrating one function with respect to another comprising a constant-frequency pulse generator, a pulse-width modulator to vary the duration of the pulses within the constant frequency and in accordance with instantaneous values of one function, a pulse-amplitude modulator to vary the amplitude of each of the width-modulated pulses in accordance with instantaneous values of the other function, bias means for introducing into the input of the amplitude modulator constant signals representing non-zero initial values of one function, and a time-integrator whose input is the doubly modulated pulses and whose output is the time-integral of the amplitude of its input.

19. An electronic integrator for evaluating $\int y\,dx$ comprising a pulse generator, a differentiator into which an arbitrary $x$-voltage is introduced to obtain a voltage varying in accordance with instantaneous values of $$\frac{dx}{dt}$$

the derivative with respect to physical time $t$ of said arbitrary $x$-function, a width modulator and an amplitude modulator both acting successively on each pulse, means for controlling one modulator in accordance with values of $y$ and the other in accordance with values of $$\frac{dx}{dt}$$

and a charge accumulator whose input is the doubly-modulated pulses and whose output is the total charge input.

20. An electronic integrator for evaluating $\int f(t)F(t)dt$, the integral with respect to physical time $t$ of the product of two functions of time, comprising a pulse generator to generate a constant-frequency chain of pulses, a pulse-width modulator for varying within said constant-frequency chain the duration of each pulse in accordance with the instantaneous values of one function $f(t)$, a pulse-amplitude modulator in series with the width-modulator for varying the amplitude of each pulse in accordance with the instantaneous values of the other function $F(t)$, and an integrator to effect the algebraic summation $\Sigma f(t)F(t)\Delta t$ of the successive time-integrals of the amplitude of each of the succession of pulses.

21. An electronic integrator for evaluating $\int f(t)F(t)dt$, the integral with respect to physical time $t$ of the product of two time-varying functions, comprising a pulse generator to generate a constant-frequency chain of pulses in two channels, width modulators in the two channels to vary the width of each pulse about a non-zero quiescent width in accordance with instantaneous values of $f(t)$, one of said width modulators acting to increase the width of the pulse while the other width modulator decreases it and neither varying the frequency, amplitude modulation means in series with the width modulator for varying the amplitudes of the pulses in accordance with instantaneous values of $F(t)$, and a charge accumulator for algebraically adding the individual charges of the modulated pulses from both channels.

22. An electronic integrator for evaluating $\int y\,dx$, comprising a pulse generator to generate a succession of pulses, the period between corresponding edges of said pulses being constant, a pulse-width modulator for varying the duration of each pulse within said constant period in accordance with instantaneous values of $$\frac{dx}{dt}$$

the derivative with respect to physical time $t$ of the quantity $x$ expressed as a function of time, a pulse-amplitude modulator in series with the width modulator for varying the amplitude of each pulse in accordance with instantaneous values of $y$, an integrator for effecting the summation $$\Sigma y \frac{dx}{dt} \Delta t$$

and bias means for the amplitude modulator to introduce into the modulator input constant signals representing an initial value of $y$ different from zero.

References Cited in the file of this patent

UNITED STATES PATENTS

| Number | Name | Date |
|---|---|---|
| 2,137,133 | Dallman | Nov. 15, 1938 |
| 2,266,194 | Guanella | Dec. 16, 1941 |
| 2,272,070 | Reeves | Feb. 3, 1942 |
| 2,415,190 | Rajchman | Feb. 4, 1947 |
| 2,428,118 | Labin et al. | Sept. 30, 1947 |
| 2,461,895 | Hardy | Feb. 15, 1949 |
| 2,462,874 | Labin | Mar. 1, 1949 |
| 2,474,156 | Namenyi-Katz | June 21, 1949 |
| 2,535,061 | Grieg | Dec. 26, 1950 |

OTHER REFERENCES

Report 435, August 7, 1944, National Defense Research Council Declassified April 2, 1946, "Electronic Computers for Division, Multiplication, Squaring, etc." (43 pages spec., 13 pages dwg.)